United States Patent
Oumi

(10) Patent No.: US 8,340,899 B2
(45) Date of Patent: Dec. 25, 2012

(54) ROUTE CALCULATION DEVICE, NAVIGATION APPARATUS AND COMPUTER READABLE MEDIUM

(75) Inventor: Masanori Oumi, Gifu (JP)

(73) Assignee: DENSO CORPORATION, Kariya (JP)

( * ) Notice: Subject to any disclaimer, the term of this patent is extended or adjusted under 35 U.S.C. 154(b) by 538 days.

(21) Appl. No.: 12/588,735

(22) Filed: Oct. 27, 2009

(65) Prior Publication Data

US 2010/0114472 A1   May 6, 2010

(30) Foreign Application Priority Data

Nov. 5, 2008   (JP) ................. 2008-284423

(51) Int. Cl.
*G01S 1/00*   (2006.01)

(52) U.S. Cl. ... 701/410; 701/400; 701/431; 340/995.21; 340/988; 340/995.2; 340/990; 709/243; 370/400

(58) Field of Classification Search .............. 701/400, 701/432; 73/178 R; 340/988, 955.21
See application file for complete search history.

(56) References Cited

FOREIGN PATENT DOCUMENTS

| JP | A-H5-340762 | 12/1993 |
|---|---|---|
| JP | A-11-044546 | 2/1999 |
| JP | A-2000-148008 | 5/2000 |
| JP | B2-3482917 | 10/2003 |
| JP | A-2005-331279 | 12/2005 |

OTHER PUBLICATIONS

Office Action dated Oct. 5, 2010 in corresponding JP patent application No. 2008-284423 (English translation enclosed).

*Primary Examiner* — Thomas Black
*Assistant Examiner* — Luke Huynh
(74) *Attorney, Agent, or Firm* — Posz Law Group, PLC

(57) ABSTRACT

A route calculation device is disclosed. The route calculation device sets a recommended route leading from a departure point through via-points and sets an order of the via-points in the recommended route, through: (1) calculating multiple optimum routes from an origin point of a departure side route to multiple unarranged via-points and selecting one unarranged via-point that constitutes one optimum route that has minimum cost among the multiple optimum routes; (2) determining the place of the one unarranged via-point in the order so that the recommended route passes through the one unarranged via-point one via-point later than the origin point, adding the one optimum route to the departure side route, and setting the origin point to the one unarranged via-point; and (3) calculating, when the number of unarranged via-points becomes one, the optimum route between the origin point and the last one unarranged via-point.

7 Claims, 9 Drawing Sheets

FIG. 3G

```
LEGENDS FOR FIGS. 3A TO 5F

⊛ : DEPARTURE POINT          ┈┈▶ : STRAIGHT LINE DISTANCE
                                   (DEP. SIDE ROUTE)
○ : VIA-POINT (UNARRANGED)   ─·▶ : OPTIMUM ROUTE
                                   (DEP. SIDE ROUTE)
⊘ : VIA-POINT (ARRANGED)     ───▶ : DETERMINED ROUTE
                                   (DEP. SIDE ROUTE)
◉ : DESTINATION POINT        ┈┈▶ : STRAIGHT LINE DISTANCE
                                   (DEST. SIDE ROUTE)
◌ : ORIGIN POINT             ─·▶ : OPTIMUM ROUTE
                                   (DEST. SIDE ROUTE)
                             ───▶ : DETERMINED ROUTE
                                   (DEST. SIDE ROUTE)
```

FIG. 7G

```
LEGENDS FOR FIGS. 7A TO 8D
⊚ : DEPARTURE POINT          ·······▶ : STRAIGHT LINE DISTANCE
                                        (DEP. SIDE ROUTE)
○ : VIA-POINT (UNARRANGED)   —·—▶ : OPTIMUM ROUTE
                                        (DEP. SIDE ROUTE)
⊘ : VIA-POINT (ARRANGED)     ——▶ : DETERMINED ROUTE
                                        (DEP. SIDE ROUTE)
⚪ : ORIGIN POINT
```

ROUTE CALCULATION DEVICE, NAVIGATION APPARATUS AND COMPUTER READABLE MEDIUM

CROSS REFERENCE TO RELATED APPLICATION

The present application is based on Japanese Patent Application No. 2008-284423 filed on Nov. 5, 2008, disclosure of which is incorporated herein by reference.

BACKGROUND OF THE INVENTION

1. Field of the Invention

The present invention relates to a route calculation device and a navigation apparatus for calculating a recommended route leading to a destination. The present invention further relates to a computer readable medium for a route calculation device or a navigation apparatus.

2. Description of Related Art

Navigation systems are widely used. A typical navigation system calculates a recommended route between the present location and a destination, and guides a user along the calculated recommended route by outputting voice or displaying images.

There is known a navigation apparatus that can accept entry of via-points and search for a recommended route leading to a destination through the via-points. In this type of navigation apparatus, a user can arrange the via-points one-by-one to set a desired order of the via-points to be passed through in a recommended route. For simplicity, an order of via-points to be passed through in a route is also referred to hereinafter as a via-point order.

Japanese Patent No. 3482917 discloses a method for a navigation apparatus to automatically set the via-point order that minimizes a traveling time or a traveling distance. In this case, a user does not necessarily re-arrange the via-point order by himself or herself and can let the navigation apparatus automatically obtain the via-point order that enables the user to travel through the via-points as in a short time as possible.

The inventor of the present application has however discovered that the below-described difficulty can arise in connection with the above-described navigation apparatus. When a navigation apparatus arranges the multiple via-points in the via-point order that minimizes route cost, it is required to repeatedly perform route search using cost calculation a lot of times. The number of times the route search is performed corresponds to the number of combinations of all of the via-points, as shown in FIG. 9. Thus, the calculation takes an enormous amount of time. The above difficulty becomes more notable as the number of via-points becomes larger.

SUMMARY OF THE INVENTION

In view of the above and other difficulties, it is an objective of the present invention to provide to a technique that can reduce computation time in route search that involves calculation of an optimum via-point order.

According to a first aspect of the present invention, there is provided a route calculation device including a controller configured to set a recommended route leading from a departure point through preliminarily-inputted multiple via-points, and configured to set an order of the multiple via-points to be passed through in the recommended route. The controller includes a first section, a second section and a third section. The first section is configured to perform a first operation such that: the first section calculates multiple optimum routes based on a predetermined cost calculation, the multiple optimum routes respectively leading from an origin point of a departure side route to multiple unarranged via-points, each unarranged via-point being one of the multiple via-points whose place in the order has not been determined yet, the origin point of the departure side route being initially set to the departure point; and the first section selects one unarranged via-point from the multiple unarranged via-points, the one unarranged via-point constituting one optimum route that has minimum cost among the multiple optimum routes. The second section is configured to perform a second operation such that: the second section determines the place of the one unarranged via-point in the order so that the recommended route passes through the one unarranged via-point one via-point later than the origin point of the departure side route; the second section adds the one optimum route, which has minimum cost among the multiple optimum routes, to the departure side route; and the second section sets the origin point of the departure side route to the one unarranged via-point. The third section is configured to perform a third operation when the number of unarranged via-points becomes one during the first and second sections are cyclically performing the first and second operations. The third section performs the third operation such that: the third section calculates the optimum route from the origin point of the departure side route to the last one unarranged via-point; and the third section determines the place of the last one unarranged via-point in the order, whereby determining the order of the via-points and the recommended route.

According to a second aspect of the present invention, a route calculation device is provided. The route calculation device includes a controller configured to set a recommended route leading to a destination point from a departure point through preliminarily-inputted multiple via-points, and configured to set an order of the multiple via-points to be passed through in the recommended route. The controller includes a first section, a second section, a third section, a fourth section and a fifth section. The first section is configured to perform a first operation such that the first section calculates multiple straight line distances including a first group of straight line distances and a second group of straight line distances. The first group of straight line distances is respectively between multiple unarranged via-points and an origin point of a departure side route. The second group of straight line distances is respectively between the multiple unarranged via-points and an origin point of a destination side route. Each unarranged via-point is one of the multiple via-points whose place in the order has not been determined yet. The origin point of the departure side route is initially set to the departure point. The origin point of the destination side route is initially set to the destination point. The second section is configured to perform a second operation such that: the second section compares the multiple straight line distances to each other to retrieve one straight line distance that is smallest among the multiple straight line distances; and the second section selects one origin point from the origin point of the departure side route and the origin point of the destination side route, the one origin point constituting the one straight line distance, which is smallest. The third section is configured to perform a third operation such that: the third section calculates multiple optimum routes based on a predetermined cost calculation, the multiple optimum routes respectively leading from the one origin point to the multiple unarranged via-points; and the third section selects one unarranged via-point from the multiple unarranged via-points, the one unarranged via-point constituting one optimum route that has minimum cost among the multiple optimum routes. The fourth section configured to perform a fourth operation such that: when the origin point of the departure side route is selected as the one origin point by the second section, the fourth section (i) determines the place of the one unarranged via-point in the order so that the recommended route passes through the one unarranged via-point one via-point later than the origin point of the departure side route, (ii) adds the one optimum route, which has minimum cost among the multiple optimum routes, to the departure side route, and (iii) sets the origin point of the departure side route to the one unarranged via-point; and, when the origin point of the destination side route is selected as the one origin point by the second section, the fourth section (i) determines the place of the one unarranged via-point in the order so that the recommended route passes through the one unarranged via-point one via-point earlier than the origin point of the destination side route, (ii) adds the one optimum route, which has minimum cost among the multiple optimum routes, to the destination side route, and (iii) sets the origin point of the destination side route to the one unarranged via-point. The fifth section is configured to perform a fifth operation when the number of unarranged via-points becomes one during the first, second, third and fourth sections are cyclically performing the first, second, third and fourth operations. The fifth section performs the fifth operation such that: the fifth section calculates the optimum route leading from the origin point of the departure side route to the origin point of the destination side route through the last one unarranged via-point; and the fifth section determines the place of the last one unarranged via-point in the order, whereby determining the order of the via-points and the recommended route.

According to a third aspect of the present invention, there is provided a navigation apparatus. A navigation apparatus includes: a route calculation device according to the first aspect or the second aspect; and a guide device configured to perform a route guidance operation to guide along the recommended route set by the route calculation device.

According to a fourth aspect of the present invention, there is provided a computer readable medium comprising a program to cause a computer of a route calculate device to function as a controller recited in the above-described first or aspects.

According to the above route calculation device, the above navigation apparatus and the above computer readable medium, it is possible to reduce computation time in route search that involves calculation of an optimum via-point order.

BRIEF DESCRIPTION OF THE DRAWINGS

The above and other objects, features and advantages of the present invention will become more apparent from the following detailed description made with reference to the accompanying drawings. In the drawings:

FIG. 3G is a diagram illustrating legends for FIGS. 3A to 3F, 4A to 4F, and 5A to 5F;

FIG. 7G is a diagram illustrating legends for FIGS. 7A to 7F and 8A to 8D.

DETAILED DESCRIPTION OF THE EXEMPLARY EMBODIMENTS

The exemplary embodiments are described below with reference to the accompanying drawings.

(Configuration of In-Vehicle Navigation Apparatus)

Figure 1:
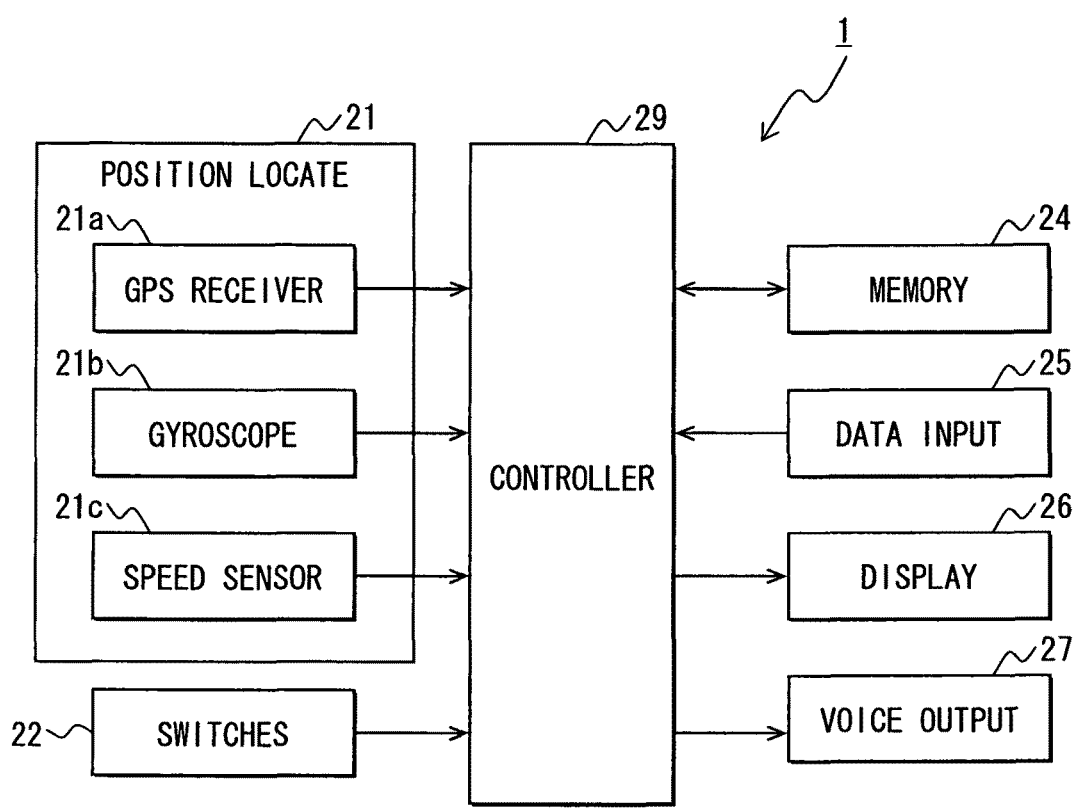
FIG. 1 is a block diagram illustrating an in-vehicle navigation apparatus.

FIG. 1 is a block diagram illustrating an in-vehicle navigation apparatus 1 according to one embodiment.

The in-vehicle navigation apparatus 1 is mountable to a movable body such as a vehicle and the like. As shown in FIG. 1, the in-vehicle navigation apparatus 1 includes a position detector 21 for detecting the present location of the vehicle, a group of operation switches 22 for inputting various instructions from user, a memory 24 for storing therein a variety of information, an data input device 25 for inputting data read from an external storage medium, a display device 26 for displaying a variety of information, a voice output device 27 for outputting a variety of guidance voice and the like, and a controller 29. The memory 24 may be external with respect to the controller 29.

The position detector 21 includes a GPS (Global Positioning System) receiver 21a, a gyroscope 21b and a vehicle speed sensor 21c. The GPS receiver 21a receives, via a GPS antenna, an electro-magnetic wave transmitted from GPS satellites. The gyroscope 21b detects angular velocity of the vehicle resulting from rotation movement. The vehicle speed sensor 21c detects speed of the vehicle. These sensors 21a to 21c have different error properties, and thus are used by being compensated each other.

The group of operation switches 22 includes, for example, a touch-sensitive panel and a mechanical key switch. The touch-sensitive panel may be integrated with a display screen of the display device 26. The mechanical key switch may be arranged in a periphery of the display device 26.

Based on control from the controller 29, the data input device 25 reads data from a non-volatile storage medium and outputs the data to the controller 29. The data stored in the non-volatile storage medium includes data for map, data for route guidance, data for map matching to improve position detection accuracy, and the like. The data stored in the non-volatile storage medium further includes a program for operation of the in-vehicle navigation apparatus 1. The non-volatile storage medium employed may include a hard disk drive, a DVD-ROM, a CD-ROM, a semiconductor memory or the like.

The display device 26 may be a color display device having a display screen, such as liquid crystal display device or the like. The display device 26 receives an image signal from the controller 29 and displays a map image and additional information items on the map image in accordance with the image signal. The additional information items include a mark representative of the present location of the subject vehicle, a guidance route to a destination, a name, a marking, a symbol representative of various landmarks, and the like.

The voice output device 27 notifies a user of a variety of information in the form of voice. The present embodiment can provide a user with a variety of guidance such as route guidance and the like through image display of the display device 26 and voice output of the voice output device 27.

The controller 29 includes a microcomputer as a main component. The controller 29 includes a CPU, a ROM, a RAM, an I/O and a bus line connecting the foregoing components. The controller 29 controls the above described and/or other devices, and performs various procedures based on programs read from the ROM or the data input device 25.

The procedures related to navigation include a map display procedure and a route guidance procedure.

In the map display procedure, the controller 29 calculates the present location of the vehicle as a combination of a coordinate and a heading direction of the vehicle based on the detection signals from the position detector 21. Further, the controller 29 reads a map image showing an, area around the present location via the data input device 25 and causes the display device 26 to display the map image.

In the route guidance procedure, the controller 29 calculates a recommended route, which may be an optimum route from the present location to the destination, based on the map data stored in the storage medium and the destination specified via manipulation of the group of operation switches 22. Further, the controller 29 causes a guide device to perform a route guidance operation to guide a user along the calculated recommendable route. To automatically calculate an optimum route to the destination, the navigation apparatus 1 may employ a method including cost calculation using the Dijkstra's algorithm. In one embodiment, the display device 26, the voice output device 27 or the like can act as the guide device for performing the route guide operation.

In one embodiment, the controller 29 performs "via-point order setting process" as a process in the above-described route guidance procedure or the like for determining a recommended route. The via-point order setting process may use preliminarily-inputted multiple via-points, which are preliminarily specified by a user as particular places that the user would like come by on his or her way. In the via-point order setting process, the controller 29 searches for an optimum via-point order so that a route can pass through all of the specified via-point with as low cost as possible. Then, the controller 29 sets the recommended route to the route that passes through the via-points in the optimum via-point order.

(Via-Point Order Setting Process of First Embodiment)

With reference to FIGS. 2 to 5F, there will be more specifically described a via-point order setting process of a first embodiment, which the controller 29 of the in-vehicle navigation apparatus 1 can perform. In the via-point setting process of the first embodiment, it is assumed that a final destination point and multiple via-points, which the recommended route should pass through, are preliminarily specified. Further, the recommended route is assumed to be calculated as a route leading from a departure point (e.g., the present location) to the destination point through all of the via-points.

Figure 2:
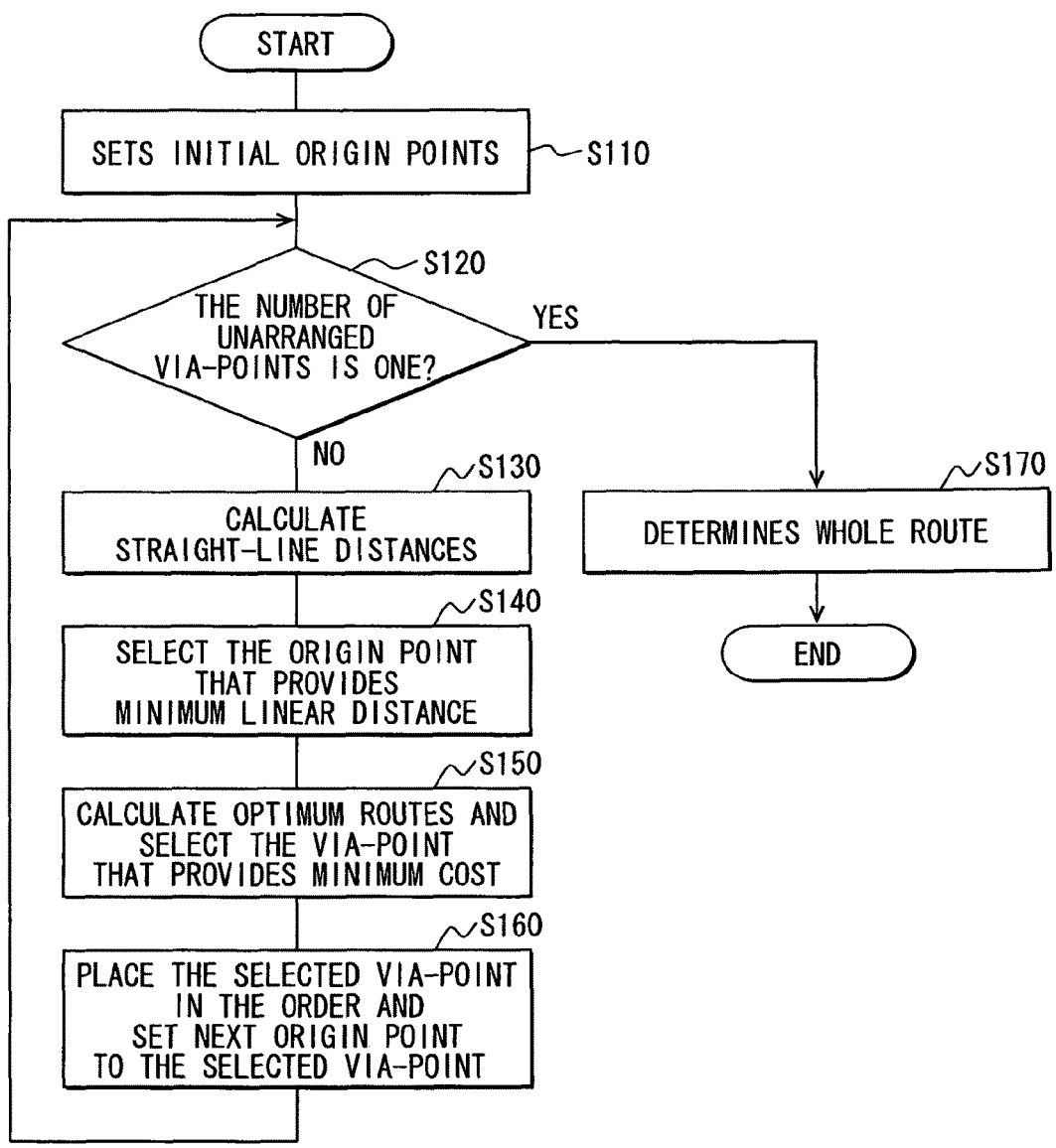
FIG. 2 is a flowchart illustrating a via-point order setting process of a first embodiment.

FIG. 2 is a flowchart illustrating the via-point order setting process according to the first embodiment.

At S110, the controller 29 sets an initial origin point of a departure side route to a departure point. The departure point is for example the present location of the vehicle. Further, the controller 29 sets an initial origin point of a destination side route to a destination point specified by a user. It should be noted that, at S110, the departure side route and the destination side route may have zero length, may have only the origin points, and may be built up in the later stages.

At S120, the controller 29 determines whether the number of unarranged via-points is one. In the above, the unarranged via-point is the via-point whose place in the via-point order has not been determined yet. In other words, the unarranged via-point is the via-point that has belonged to neither the established departure side route nor the established destination side route.

When it is determined that the number of unarranged via-points is more than one, corresponding to "NO" at S120, the process proceeds to S130. At S130, the controller 29 calculates multiple straight line distances including a first group of straight line distances and a second group of straight line distances. The straight line distances in the first group are respectively distances in straight line between the origin point of the departure side route and the multiple unarranged via-points. The straight line distances in the second group are respectively distances in straight line between the origin point of the destination side route and the multiple unarranged via-points.

At S140, the controller 29 compares the multiple straight line distances to each other to retrieve one straight line distance that is smallest among the multiple straight line distances calculated at S130. Further, the controller 29 selects one origin point from the origin point of the departure side route and that of the destination side route so that the one origin point constitutes a combination that forms the smallest straight line distance.

At S150, the controller 29 calculates multiple optimum routes between the origin point selected at S140 and the multiple unarranged via-points based on cost calculation, and selects one optimum route that has minimum cost among the multiple calculated optimum routes. Further, the controller 29 selects at S150 one unarranged via-point from the multiple unarranged via-point, so that the selected one unarranged via-point and the origin point selected at S140 constitute the one optimum route having minimum cost. In the above, when the origin point of the departure side route is selected at S140, the controller 29 calculates at S150 an optimum route from the origin point of the departure side rout to each unarranged via-point. When the origin point of the destination side route is selected at S140, the controller 29 calculates at S150 an optimum route from the origin point of the destination side route to each unarranged via-point. A search criteria used in calculation of an optimum route between an origin point and a via-point may be one activated by default in the in-vehicle navigation apparatus 1 or may be one set by user. The search criteria may include, for example, time priority, distance priority, toll road priority, and the like.

It is possible to reduce the number of route calculations at S150 depending on situations, by calculating optimum routes between the origin point and the unarranged via-points in the below-described way.

That is, the controller 29 calculates the multiple optimum routes in the order of increasing straight line distance from the origin point selected at S140 to the multiple unarranged via-points. When the controller 29 determines, in the course of calculating the multiple optimum routes in the order of increasing straight line distance, that the pre-calculated optimum route satisfies a predetermined condition, the controller 29 halts calculation of the multiple optimum routes and regards the pre-calculated optimum route satisfying the predetermined condition as the one optimum route having minimum cost, and the process proceeds to S160. At a time when the pre-calculated optimum route is determined to satisfy the predetermined condition, the multiple optimum routes include a first set of optimum routes, which has been calculated already, and a second set of optimum routes, which has not been calculated yet. The multiple straight line distances includes a first set of straight line distances corresponding to the first set of optimum routes and a second set of straight line distances corresponding to the second set of optimum routes.

The predetermined condition is, for example, that a first distance $D_{r, min}$ is less than or equal to a second distance $D_{l, min}$, where the first distance $D_{r, min}$ is a road distance along the one optimum route that has minimum cost among the first set of optimum routes, and the second distance $D_{l, min}$ is smallest straight line distance among the second set of straight line distances.

Explanation returns to FIG. 2.

At S160, the controller 29 determines the place of the via-point selected at S150 in the via-point order and determines the optimum route selected at S150 as a part of the recommended route. Further, the controller 29 sets the via-point selected at S150 to the next origin point. More specifically, when the origin point of the departure side route is selected at S140, the controller 29 determines the place of the via-point selected at S150 in the via-points order such that the recommended route passes through the via-point selected at S150 one via-point later than the origin point selected at S140, and the optimum route selected at S150 is determined as or added to the departure side route. Further, the via-point selected at S150 is set to the next origin point of the departure side route. When the origin point of the destination side route is selected at S140 on the other hand, the controller 29 determines the place of the via-point selected at S150 in the via-point order such that the recommend route passes through the via-point selected at S150 one via-point earlier than the origin point selected at S140, and the optimum route selected at S150 is determined as or added to the destination side route. Further, the via-point selected at S150 is set to the next origin point of the destination side route. After S160, the process returns to S120.

The controller 29 cyclically performs the steps S120 to S160, thereby building up the recommended route through sequentially incorporating the unarranged via-points in the departure side route or the destination side route. When it is determined that the number of unarranged via-points becomes one (which is also referred to as a last one unarranged via-point) in the course of cyclically performing the steps S120 to S160, the determination at S120 results in "YES" and the process proceeds to S170.

At S170, the controller 29 calculates an optimum route leading from the origin point of the departure side route to the origin point of the destination side route through via the last one unarranged via-point, determines the place of the last one unarranged via-point in the via-point order, and determines the calculated optimum route as a part of the recommended route. Further, the controller 29 sets the recommended route to a collection of all the determined optimum routes. Then, the via-point order setting process is ended.

Figure 3A:
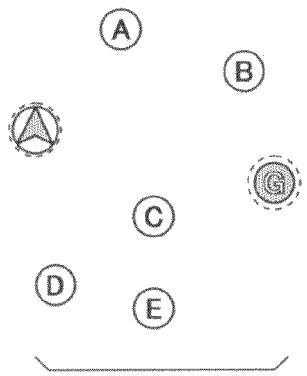
FIGS. 3A to 3F, 4A to 4F, and 5A to 5F are diagrams illustrating an exemplary case of setting a via-point order based on the via-point order setting process of the first embodiment.

With reference to FIGS. 3A to 5F, there will be described an illustrative case of setting a recommended route while sequentially determining the place of each via-point in the via-point order in accordance with the via-point order setting process of the first embodiment. In this illustrative case, as shown in FIG. 3A, it is assumed that a recommended route to be calculated leads to a destination point from a departure point (e.g., the present location) through all of the studded via-points A, B, C, D and E.

Figure 3B:
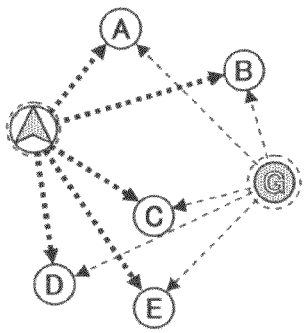
Figure 3C:
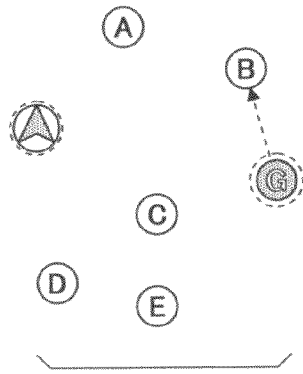

As shown in FIG. 3A, the origin point of the departure side route is initially set to the departure point, and the origin point of the destination side route is initially set to the destination point. Then, as shown in FIG. 3B, the controller 29 calculates straight line distances between the origin point (which matches the departure point in this stage) of the departure side route and respective unarranged via-points A, B, C, D and E, and calculates straight line distances between the origin point (which matches the destination point in this stage) of the destination side route and respective unarranged via-points A, B, C, D and E. It is assumed that the straight line distance between the origin point (which matches the destination point in this stage) of the destination side route and the unarranged via-point B is smallest among the calculated straight line distances. Thus, as shown in FIG. 3C, from the origin points and the unarranged via-points A to E, the controller 29 selects the one origin point (which matches the destination point in this stage) and the unarranged via-point B, a combination of which forms the smallest straight line distance.

Figure 3D:
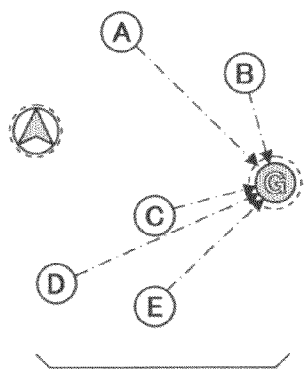
Figure 3E:
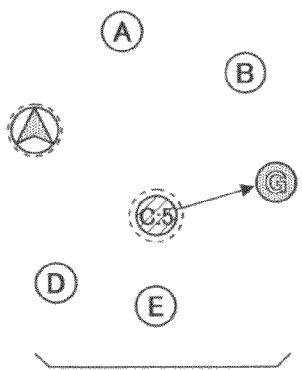

Then, as shown in FIG. 3D, the controller 29 calculates optimum routes between respective unarranged via-points A, B, C, D, E and the selected origin point (which matches the destination point in this stage) of the destination side route. Since the origin point of the destination side route has been selected from the origin points, the controller 29 calculates the optimum routes from respective unarranged via-points A, B, C, D and E to the origin point (the destination point in this stage). It is assumed that the optimum route from the unarranged via-point C to the origin point (the destination point in this stage) has minimum cost among the calculated optimum routes. Thus, as shown in FIG. 3E, the place of the unarranged via-point C in the via-point order is determined so that the recommended route passes through the via-point C one via-point earlier than the destination point. In other words, the via-point C is determined as the fifth via-point in the via-point order. Further, the optimum route from the via-point C to the origin point (the destination point in this stage) is determined as and added to the destination side route. The next origin point of the destination side route is then set to the via-point C.

Figure 3F:
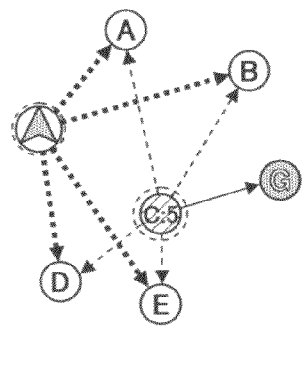
Figure 4A:
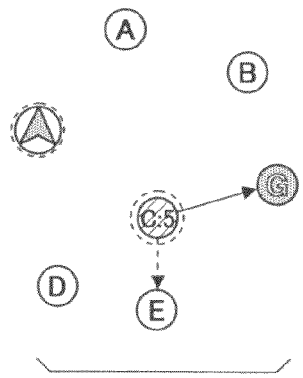

Then, as shown in FIG. 3F, the controller 29 calculates the straight line distances between the origin point (which is the departure point in this stage) of the departure side route and the unarranged via-points A, B, D, E. Further, the controller 29 calculates the straight line distances between the origin point (the via-point C in this stage) of the destination side route and the unarranged via-points A, B, D, E. It is assumed that the straight line distance between the origin point (which is the via-point C in this stage) of the destination side route and the unarranged via-point E is smallest among the calculated straight line distances. Thus, as shown in FIG. 4A, from the origin points and the unarranged via-points A, B, D, E, the controller 29 selects the origin point (which is the via-point C in this stage) and the unarranged via-point E, a combination of which forms the smallest straight line distance.

Figure 4B:
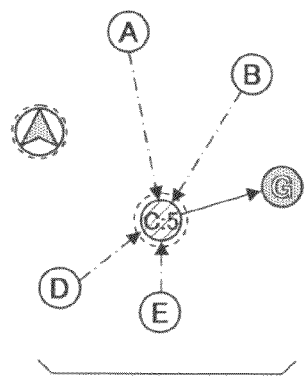
Figure 4C:
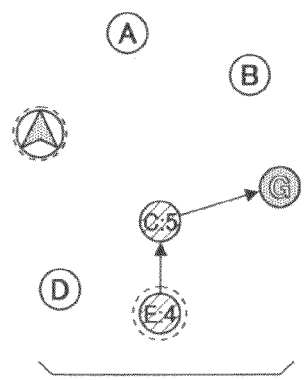

Then, as shown in FIG. 4B, the controller 29 retrieves optimum routes between the selected origin point (which is the via-point C in this stage) and the unarranged via-points A, B, D, E. Since the origin point of the destination side route has been selected, the controller 29 calculates optimum routes from respective unarranged via-points A, B, D, E to the origin point (which is the via-point C in this stage). It is assumed that the optimum route from the unarranged via-point E to the origin point (which is the via-point C at this stage) has minimum cost among the calculated optimum routes. Thus, as shown in FIG. 4C, the place of the unarranged via-point E in the via-point order is determined so that the recommended route passes through the via-point E one via-point earlier than the origin point (which is the via-point C in this example) of the destination side route. In other words, the via-point E is determined as the fourth via-point in the via-point order. Further, the optimum route from the via-point E to the origin point (which is the via-point C in this example) of the destination side route is determined as or added to the destination side route. The next origin point of the destination side route is set to the via-point E.

Figure 4D:
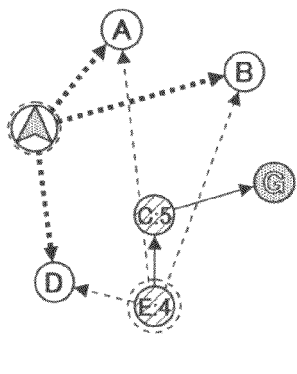
Figure 4E:
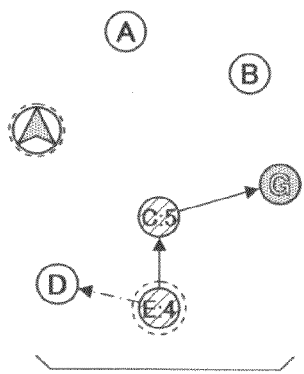

Then, as shown in FIG. 4D, the controller 29 calculates the straight line distances between the origin point (which is the departure point in this stage) of the departure side route and the unarranged via-points A, B, D. Further, the controller calculates the straight line distances between the origin point (which is the via-point E in this stage) of the destination side route and the unarranged via-points A, B, D. It is assumed that the straight line distance between the origin point (the via-point E in this stage) of the destination side route and the via-point D is smallest among the calculated straight line distances. Thus, as shown in FIG. 4E, from the origin points and the unarranged via-points A, B, D, the controller 29 selects the one origin point (which matches the via-point E in this stage) and the unarranged via-point D, a combination of which forms the smallest straight line distance.

Figure 4F:
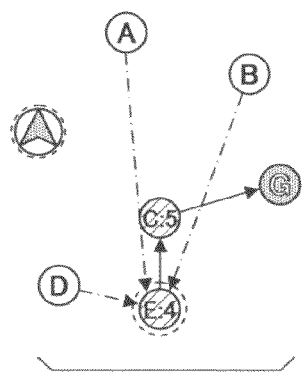
Figure 5A:
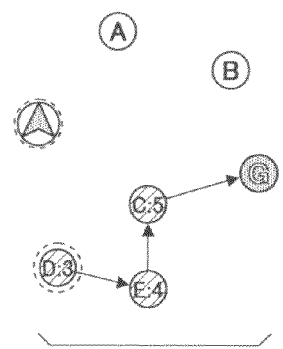

Then, as shown in FIG. 4F, the controller 29 retrieves optimum routes between the selected origin point (which is the via-point E in this stage) and the unarranged via-points A, B, D. Since the origin point of the destination side route has been selected, the controller 29 calculates the optimum routes from respective unarranged via-points A, B, D to the origin point (which is the via-point E in this stage). It is assumed that the optimum route from the via-point D to the origin point (the via-point E in this stage) has minimum cost among the calculated optimum routes. Thus, as shown in FIG. 5A, the place of the via-point D in the via-point order is determined so that the recommended route passes through the via-point D one via-point earlier than the origin point of the destination side route. In other words, the via-point D is determined as the third via-point in the via-point order. Further, the optimum route from the via-point D to the origin point (the via-point E in this stage) of the destination side route is added to the destination side route. The next origin point of the destination side route is set to the via-point D.

Figure 5B:
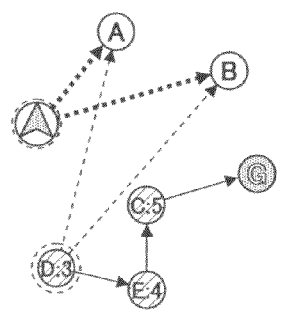
Figure 5C:
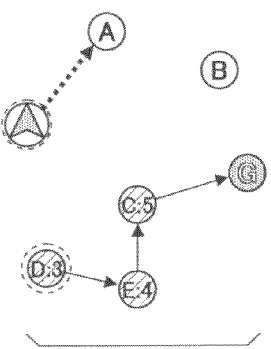

Then, as shown in FIG. 5B, the controller 29 calculates the straight line distances between the origin point (which is the departure point in this stage) of the departure side route and respective unarranged via-points A, B. Further, the controller calculates the straight line distances between the origin point (which is the via-point D in this stage) of the destination side route and the unarranged via-points A, B. It is assumed that the straight line distance between the origin point (which is the departure point in this stage) of the departure side route and the via-point A is smallest among the calculated straight line distances. Thus, as shown in FIG. 5C, from the origin points and the unarranged via-point A, B, the controller 29 selects the origin point (which matches the departure point in this stage) and the unarranged via-point A, a combination of which forms the smallest line straight distance.

Figure 5D:
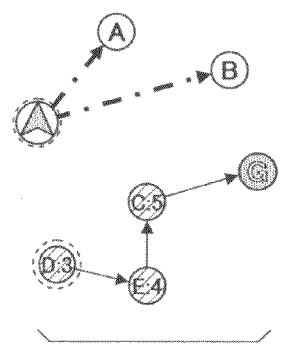
Figure 5E:
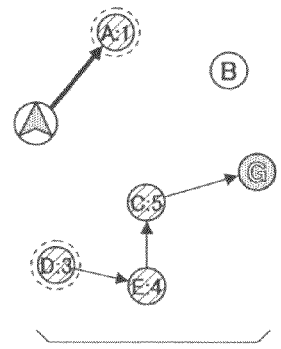

Then, as shown in FIG. 5D, the controller 29 retrieves optimum routes between the selected origin point (which is the departure point in this stage) and respective unarranged via-points A, B. Since the origin point of the departure side route has been selected, the controller 29 calculates the optimum routes from the origin point (which is the departure point in this stage) to the unarranged via-points A, B. It is assumed that the optimum route from the origin point (which is the departure point in this stage) to the via-point A has minimum cost among the calculated optimum routes. Thus, as shown in FIG. 5E, the place of the via-point A in the via-point order is determined so that the recommended route passes through the via-point A one via-point later than the origin point (the departure point in this stage) of the departure side route. In other words, the via-point A is determined as the first via-point in the via-point order. Further, the optimum route from the origin point (which is the departure point in this stage) to the via-point A is added to the departure side route. The next origin point of the departure side route is set to the via-point A.

Figure 5F:
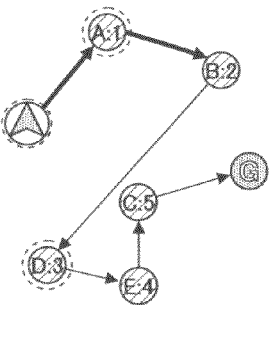

In this stage, the number of unarranged via-points becomes one. Thus, as shown in FIG. 5F, the controller calculates an optimum route that leads from the origin point (which is the via-point A in this stage) of the departure side route to origin point (which is the via-point D in this stage) of the destination side route through the last one unarranged via-point B. Further, the controller 29 places the via-point B between the via-point A and the via-point D in the via-point order. In other words, the via-point B is determined to be the second via-point in the via-point order. Then, the controller 29 sets the collection of the determined optimum routes as the recommended route, which now leads from the departure point to the destination point.

In the first embodiment, the controller 29 performing S130 can act as a first section or first means, the controller performing S140 can act as a second section or second means, the controller performing S150 can act as a third section or third means, the controller performing S160 can act as a fourth section or fourth means, and the controller 29 performing S170 can act as a fifth section or fifth means.

(Via-Point Order Setting Process of Second Embodiment)

With reference to FIGS. 6 to 8D, there will be more specifically described a via-points order setting process of a second embodiment, which the controller 29 of the in-vehicle navigation apparatus 1 can perform. In the via-points order setting process of the second embodiment, it is assumed that: multiple via-points to be passed through are specified by a user; the final destination point is not specified; and the recommended route starting from the departure point (e.g., the present location) and passing through all of the via-points is to be set. Thus, the destination point cannot be determined until the order of via-points in the recommended road is determined. The via-point whose place in the via-order is the last via-point is set to the destination point, which the recommended route finally leads to.

Figure 6:
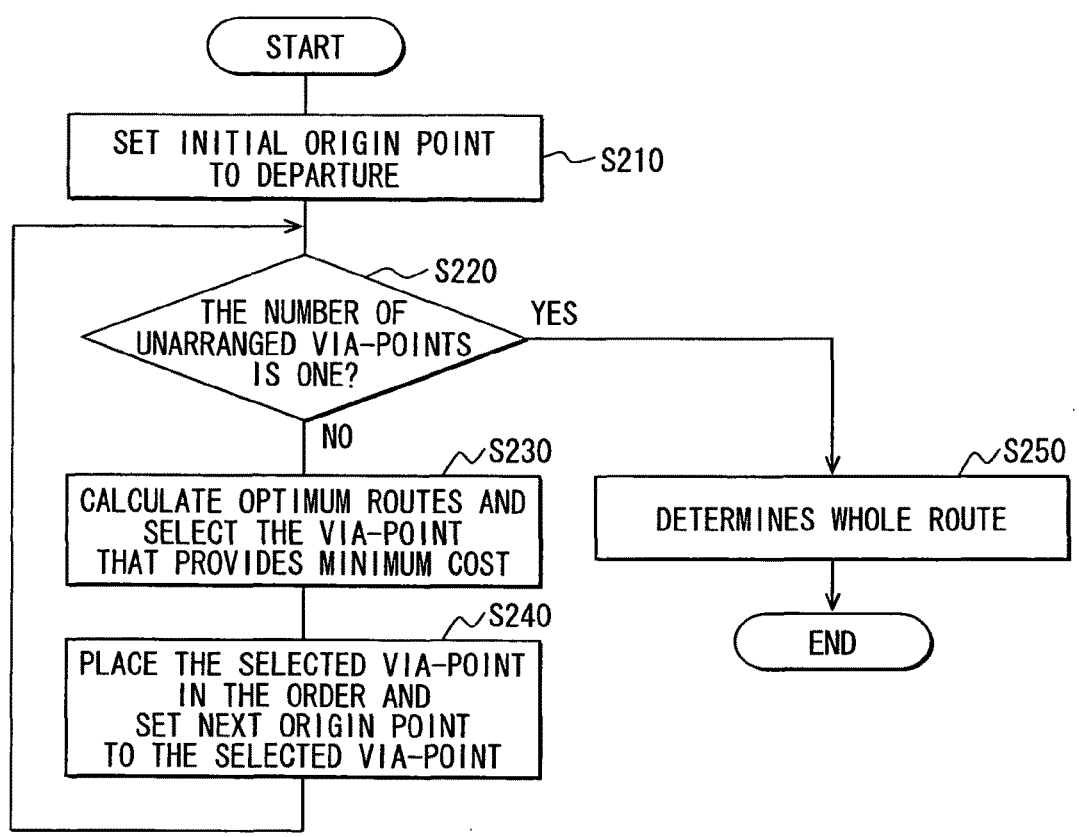
FIG. 6 is a flowchart illustrating a via-point order setting process of a second embodiment.

FIG. 6 is a flowchart illustrating the via-point order setting process of the second embodiment.

At S210, the controller 29 sets the initial origin point of the departure side route to the departure point, which may be the present location of the subject vehicle. It should be noted that, at S210, the departure side route may have zero length, may have only the origin point, and may be built up in the later stages.

At S220, the controller 29 determines whether the number of unarranged via-points is one. In the above, the unarranged via-point is the via-point whose place in the via-point order has not been determined yet. In other words, the unarranged via-point is the via-point that has belonged to neither the departure side route nor the destination side route.

When it is determined that number of unarranged via-points is two or more, corresponding to "NO" at S220, the process proceeds to S230. At S230, the controller 29 calculates optimum routes between the origin point of the departure side route and respective unarranged via-points based on performing cost calculation. Further, the controller 29 selects one optimum route that has minimum cost among the calculated optimum routes. A search criteria used in calculation of a optimum route between an origin point and a via-point may be one activated by default in the in-vehicle navigation apparatus 1 or may be one set by user. The search criteria may include, for example, time priority, distance priority, toll road priority, and the like.

It is possible to reduce the number of route calculations at S230 depending on situations, by calculating optimum routes between the origin point and respective unarranged via-points in the below-described way. That is, the multiple straight line distances between the origin point of the departure side route and respective unarranged via-points are calculated. Then, the optimum routes are calculated in the order of increasing straight line distance from the origin point to the unarranged via-points. When the controller 29 determines, in the course of calculating the multiple optimum routes in the order of increasing straight line distance, that the pre-calculated optimum route satisfies a predetermined condition, the controller 29 halts calculation of the multiple optimum routes and the process proceeds to S240. At a time when the pre-calculated optimum route is determined to satisfy the predetermined condition, the multiple optimum routes include a first set of optimum routes, which has been calculated already, and a second set of optimum routes, which has not been calculated yet. The multiple straight line distances includes a first set of straight line distances corresponding to the first set of optimum routes and a second set of straight line distances corresponding to the second set of optimum routes.

The predetermined condition is, for example, that a first distance $D_{r,\ min}$ is less than or equal to a second distance $D_{l,\ min}$, where the first distance $D_{r,\ min}$ is a road distance along the one optimum route that has minimum cost among the first set of optimum routes, and the second distance $D_{l,\ min}$ is smallest straight line distance among the second set of straight line distances.

Explanation returns to FIG. 6.

At S240, the controller 29 determines the place of the via-point selected at S230 in the via-point order so that the recommended route passes through the via-point selected at S230 next to the origin point of the departure side route. Further, the optimum route between the origin point and the via-point selected at S230 is added to the departure side route. Further, the next origin point of the departure side route is set to the via-point selected at S230. After S240, the process returns to S220.

Then, the controller 29 cyclically performs the steps S220 to S240, thereby building up the recommended route through sequentially incorporating the via-point in the departure side route. When the controller 29 determines, in the course of cyclically performing the steps S220 to S240, that the number of unarranged via-points becomes one, the determination at S220 results in "YES" and the process proceeds to S250. At S250, the controller 29 calculates an optimum route from the origin point of the departure side route to the last one unarranged via-point, determines the place of the last one unarranged via-point in the via-point order, and determines the calculated optimum route as a part of the recommended route. Further, the controller 29 sets the recommended route to a collection of all of the determined optimum routes. Then, the via-point order setting process is ended.

Figure 7A:
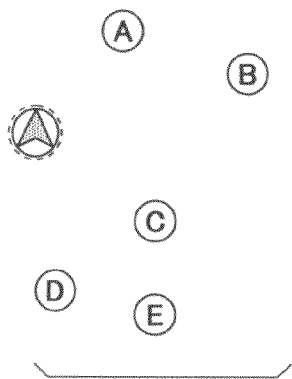
FIGS. 7A to 7F and 8A to 8D are diagrams illustrating an exemplary case of setting a via-point order based on the via-point order setting process of the second embodiment.

With reference to FIGS. 7A to 8D, there will be described an illustrative case of setting a recommended route while sequentially determining the place of the via-point in the via-point order in accordance with the via-point order setting process of the second embodiment. In this illustrative case, as shown in FIG. 7A, it is assumed that the recommended route to be calculated leads from the departure point (e.g., the present location) through all of the studded via-points A, B, C, D and E.

Figure 7B:
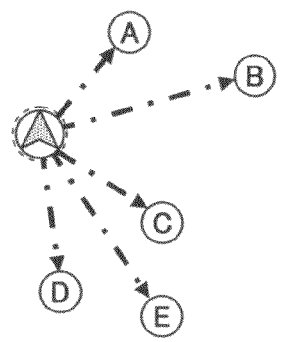
Figure 7C:
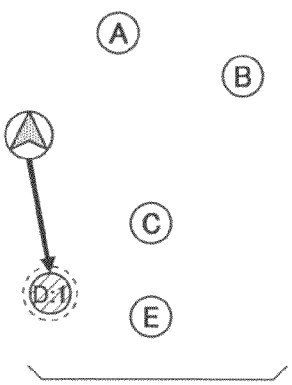

As shown in FIG. 7A, the origin point of the departure side route is initially set to the departure point. Then, as shown in FIG. 7B, the controller 29 calculates optimum routes from the origin point (which matches the departure point in this stage) of the departure side route to respective unarranged via-points A, B, C, D and E. It is assumed that the optimum route from the origin point (which is the departure point in this stage) to the via-point D has minimum cost among the calculated optimum routes. Thus, as shown in FIG. 7C, the place of the via-point D in the via-point order is determined such that the recommended route passes through the via-point D next to the origin point (the departure point in this stage) of the departure side route. In other words, the via-point D is determined as the first via-point in the via-point order. Further, the optimum route from the origin point (which is the departure point in this stage) to the via-point D is added to the departure side route. Then, the next origin point of the departure side route is set to the via-point D.

Figure 7D:
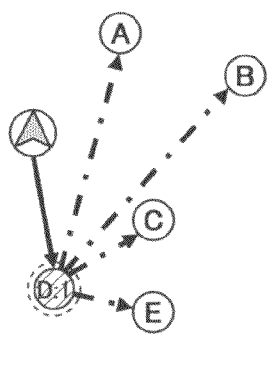
Figure 7E:
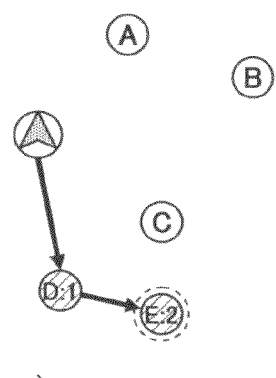

Then, as shown in FIG. 7D, the controller 29 retrieves optimum routes between the newly set origin point (which is the via-point D in this stage) and the unarranged via-points A, B, C, E. It is assumed that the optimum route from the origin point (which is the via-point D in this stage) to the via-point E has minimum cost among the calculated optimum routes. Thus, as shown in FIG. 7E, the place of the via-point E in the via-point order is determined such that the recommended route passes through the via-point E one via-point later than the origin point (the via-point D in this stage) of the departure side route. In other words, the via-point E is determined as the second via-point in the via-point order. Further, the optimum route from the origin point (which is the via-point E in this stage) to the via-point D is added to the departure side route. The next origin point of the departure side route is set to the via-point E.

Figure 7F:
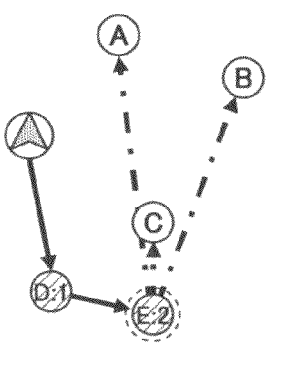
Figure 8A:
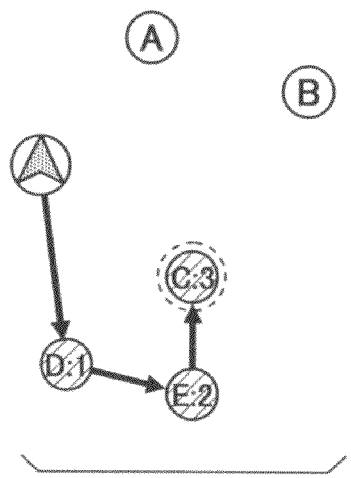

Then, as shown in FIG. 7F, the controller 29 retrieves optimum routes between the newly set origin point (which is the via-point E in this stage) and the unarranged via-points A, B, C. It is assumed that the optimum route from the origin point (which is the via-point E in this stage) to the via-point C has minimum cost among the calculated optimum routes. Thus, as shown in FIG. 8A, the place of the via-point C in the via-point order is determined so that the recommended route passes through the via-point C one via-point later than the origin point (which is the via-point E in this stage) of the departure side route. In other words, the via-point C is determined as the third via-point in the via-point order. Further, the optimum route from the origin point (which is the via-point E in this stage) to the via-point C is added to the departure side route. The next origin point of the departure side route is set to the via-point C.

Figure 8B:
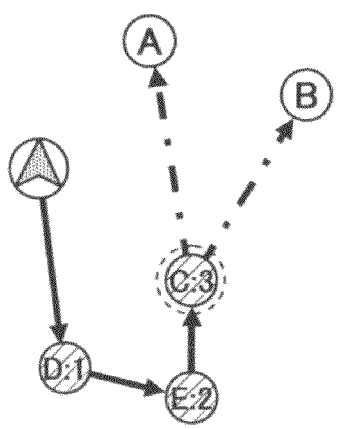
Figure 8C:
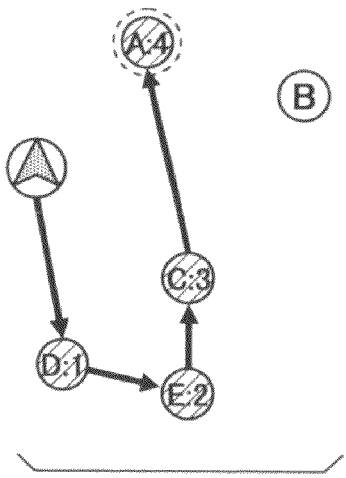

Then, as shown in FIG. 8B, the controller 29 retrieves optimum routes between the newly-set origin point (which is the via-point C in this stage) and the unarranged via-points A, B. It is assumed that the optimum route from the origin point (which is the via-point C in this stage) to the via-point A has minimum cost among the calculated optimum routes. Thus, as shown in FIG. 8C, the place of the via-point A in the via-point order is determined so that the recommended route passes through the via-point A one via-point later than the origin point (which is the via-point C in this stage) of the departure side route. In other words, the via-point A is determined as the fourth via-point in the via-point order. Further, the optimum route from the origin point (which is the via-point C in this stage) to the via-point A is added to the departure side route. The next origin point of the departure side route is set to the via-point A.

Figure 8D:
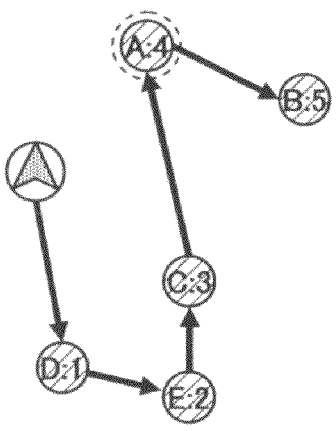
Figure 9:
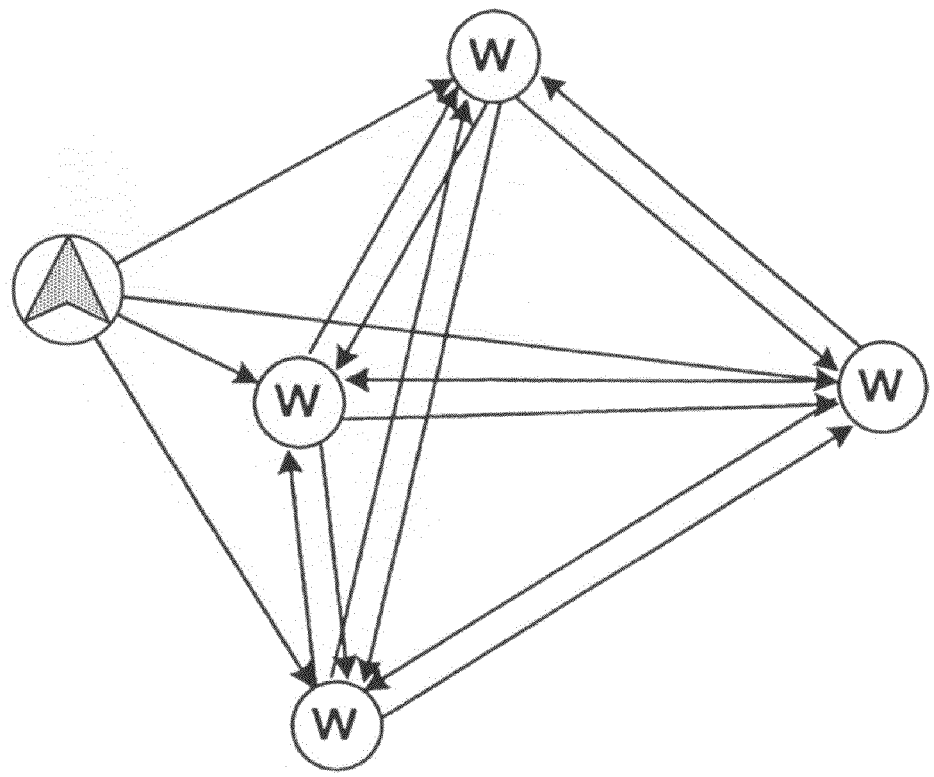
FIG. 9 is a diagram illustrating a difficulty associated with a conventional method of setting a via-point order.

At this stage, the number of unarranged via-points becomes one (which is referred to as a last one unarranged via-point). Thus, as shown in FIG. 8D, the controller 29 calculates an optimum route leading from the origin point (the via-point A in this stage) of the departure side route to the last one unarranged via-point B. Further, the place of the via-point B in the via-point order is determined so that the recommended route passes through the via-point B one via-point later than the origin point (which is the via-point A in this stage) of the departure side route. In other words, the via-point B is determined as the fifth via-point in the via-point order. Then, the controller 29 sets the collection of the determined optimum routes as the recommended route, which now leads from the departure point to the via-point B through the via-points A, C, D, E.

In the second embodiment, the controller 29 performing S230 can act as a first section or first means, the controller 29 performing S240 can act as a second section or second means, and the controller 29 performing S250 can act as a third section or third means.

(Advantages)

The above embodiments can provide the following unpredictable advantages.

(1) In the via-point order setting process of the first embodiment, it is assumed that the destination point is preliminarily specified by a user, and the recommended route leading to the destination point from the departure point through all of the via-points is to be set. In the first embodiment, the origin point of the departure side route and that of the destination side route are initially set to the departure point and the destination point, respectively. Then, the via-point order is determined by sequentially selecting one via-point and one origin point that provide a route with small cost, wherein the selected origin point is one of the origin point of the departure side route and that of the destination side route and is closer to the selected via-point than the order of the origin point is. According the above manners, it is possible to remarkably reduce the number of calculations of routes compared to a case of calculating all of possible routes corresponding to the combinations of all of the via-points, and it is possible to set the recommend route whose cost is relatively small. It is therefore possible to reduce computation time in the route search that involves the optimum via-point order calculation.

(2) In the via-point setting process of the second embodiment, it is assumed that: the final destination point is not preliminarily fixed, in other words, the last via-point in the via-point order is not fixed; and the final destination point is also one of arrangement targets in setting the recommended route. In the second embodiment, the origin point is initially set to the departure point (e.g., the present location). The via-point order is determined by sequentially selecting the via-point that provides small cost to a route between the selected via-point and the origin point. According the above manners, it is possible to remarkably reduce the number of calculations of routes compared to a case of calculating all of the routes corresponding to combinations of all of the via-points, and it is possible to set the recommended route whose cost is relatively small. It is therefore possible to reduce computation time in the route search that involves calculating an optimum order of via-points.

(3) It is possible to further reduce the number of calculations of routes between the origin point and the unarranged via-points in the below-described way. If the predetermined condition "the first distance $D_{r,\,min}$ is less than or equal to the second distance $D_{l,\,min}$" is satisfied in the course of calculating the optimum routes between the origin point and respective unarranged via-points (cf. S150 in FIG. 2 and at S230 in FIG. 6), the calculations of the optimum routes are halted. The first distance $D_{r,\,min}$ is defined as a road distance along one optimum route that has minimum cost among the pre-calculated optimum routes, and the second distance $D_{l,min}$ is defined as one straight line distance between the origin point and the unarranged via-point, the one straight line distance being smallest one among a group of straight line distances between the origin point and the unarranged via-points, the group of straight line distances corresponding to the optimum routes which have not been calculated yet. In the above, when the road distance along the optimum route is smaller than the smallest straight line distance, it is highly possible that the road distance along the optimum route is smallest among road distance along other optimum routes because, in general, a smaller load distance along a route corresponds to a small cost of the route. Therefore, it is possible to set the route with low cost even if: the via-point satisfying the predetermined condition is selected as the via-point providing minimum cost at a time when the predetermined condition is satisfied; and subsequent optimum route calculation is omitted.

(Modifications)

The above-described embodiments can be modified in various ways.

For example, although the in-vehicle navigation apparatus 1 has been described as embodiments of the present invention, a technique according to the present invention is applicable to an information terminal device and the like such as a cellular phone, a personal computer, capable of executing an application having a navigation function and the like.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. A route calculation device comprising:
a controller configured to set a recommended route leading to a destination point from a departure point through preliminarily-inputted multiple via-points, and configured to set an order of the multiple via-points to be passed through in the recommended route, the controller including:
a first section configured to perform a first operation such that
the first section calculates multiple straight line distances including a first group of straight line distances and a second group of straight line distances, the first group of straight line distances being respectively between multiple unarranged via-points and an origin point of a departure side route, the second group of straight line distances being respectively between the multiple unarranged via-points and an origin point of a destination side route, each unarranged via-point being one of the multiple via-points whose place in the order has not been determined yet, the origin point of the departure side route being initially set to the departure point, the origin point of the destination side route being initially set to the destination point;

a second section configured to perform a second operation such that:
    the second section compares the multiple straight line distances to each other to retrieve one straight line distance that is smallest among the multiple straight line distances; and
    the second section selects one origin point from the origin point of the departure side route and the origin point of the destination side route, the one origin point constituting the one straight line distance, which is smallest;
a third section configured to perform a third operation such that:
    the third section calculates multiple optimum routes based on a predetermined cost calculation, the multiple optimum routes respectively leading from the one origin point to the multiple unarranged via-points; and
    the third section selects one unarranged via-point from the multiple unarranged via-points, the one unarranged via-point constituting one optimum route that has minimum cost among the multiple optimum routes;
a fourth section configured to perform a fourth operation such that:
    when the origin point of the departure side route is selected as the one origin point by the second section, the fourth section (i) determines the place of the one unarranged via-point in the order so that the recommended route passes through the one unarranged via-point one via-point later than the origin point of the departure side route, (ii) adds the one optimum route, which has minimum cost among the multiple optimum routes, to the departure side route, and (iii) sets the origin point of the departure side route to the one unarranged via-point; and
    when the origin point of the destination side route is selected as the one origin point by the second section, the fourth section (i) determines the place of the one unarranged via-point in the order so that the recommended route passes through the one unarranged via-point one via-point earlier than the origin point of the destination side route, (ii) adds the one optimum route, which has minimum cost among the multiple optimum routes, to the destination side route, and (iii) sets the origin point of the destination side route to the one unarranged via-point;
a fifth section configured to perform a fifth operation when the number of unarranged via-points becomes one during the first, second, third and fourth sections are cyclically performing the first, second, third and fourth operations,
the fifth section performing the fifth operation such that:
    the fifth section calculates the optimum route leading from the origin point of the departure side route to the origin point of the destination side route through a last one unarranged via-point; and
    the fifth section determines the place of the last one unarranged via-point in the order, whereby determining the order of the via-points and the recommended route.

2. The route calculation device, according to claim 1, wherein:
the third section calculates the multiple optimum routes in an order of increasing straight line distance from the one origin point to the multiple unarranged via-points;
when the third section determines, in the course of calculating the multiple optimum routes in the order of increasing straight line distance, that a pre-calculated optimum route satisfies a predetermined condition, the third section halts calculation of the multiple optimum routes and regards the pre-calculated optimum route satisfying the predetermined condition as the one optimum route having minimum cost, and the fourth section starts to perform the fourth operation;
at a time when the pre-calculated optimum route is determined to satisfy the predetermined condition, the multiple optimum routes include a first set of optimum routes, which has been calculated already and includes the pre-calculated optimum route, and a second set of optimum routes, which has not been calculated yet;
the multiple straight line distances includes a first set of straight line distances corresponding to the first set of optimum routes and a second set of straight line distances corresponding to the second set of optimum routes;
the predetermined condition is such that a first distance $D_{r,\,min}$ is less than or equal to a second distance $D_{l,\,min}$;
the first distance $D_{r,\,min}$ is a road distance along the one optimum route that has minimum cost among the first set of optimum routes; and
the second distance $D_{l,\,min}$ is smallest straight line distance among the second set of straight line distances.

3. A non-transitory computer readable medium comprising a program to cause a computer of a route calculate device to function as a controller recited in claim 1.

4. A route calculation device comprising:
a controller configured to set a recommended route leading from a departure point through preliminarily-inputted multiple via-points, and configured to set an order of the multiple via-points to be passed through in the recommended route, the controller including:
a first section configured to perform a first operation such that:
    the first section calculates multiple optimum routes based on a predetermined cost calculation, the multiple optimum routes respectively leading from an origin point of a departure side route to multiple unarranged via-points, each unarranged via-point being one of the multiple via-points whose place in the order has not been determined yet, the origin point of the departure side route being initially set to the departure point; and
    the first section selects one unarranged via-point from the multiple unarranged via-points, the one unarranged via-point constituting one optimum route that has minimum cost among the multiple optimum routes;
a second section configured to perform a second operation such that:
    the second section determines the place of the one unarranged via-point in the order so that the recommended route passes through the one unarranged via-point one via-point later than the origin point of the departure side route;
    the second section adds the one optimum route, which has minimum cost among the multiple optimum routes, to the departure side route; and
    the second section sets the origin point of the departure side route to the one unarranged via-point; and
a third section configured to perform a third operation when the number of unarranged via-points becomes one during the first and second sections are cyclically performing the first and second operations, the third section performing the third operation such that:

the third section calculates the optimum route leading from the origin point of the departure side route to a last one unarranged via-point; and the third section determines the place of the last one unarranged via-point in the order, whereby determining the order of the via-points and the recommended route, wherein:

the first section calculates multiple straight line distances, which are respectively between the origin point and the multiple unarranged via-points;

the first section calculates the multiple optimum routes in an order of increasing straight line distance;

when the first section determines, in the course of calculating the multiple optimum routes in the order of increasing straight line distance, that a pre-calculated optimum route satisfies a predetermined condition, the first section halts calculation of the multiple optimum routes and regards the pre-calculated optimum route satisfying the predetermined condition as the one optimum route having minimum cost, and the second section starts to perform the second operation;

at a time when the pre-calculated optimum route is determined to satisfy the predetermined condition, the multiple optimum routes include a first set of optimum routes, which has been calculated already and including the pre-calculated optimum route, and a second set of optimum routes, which has not been calculated yet;

the multiple straight line distances includes a first set of straight line distances corresponding to the first set of optimum routes and a second set of straight line distances corresponding to the second set of optimum routes;

the predetermined condition is such that a first distance $D_{r,\,min}$ is less than or equal to a second distance $D_{l,\,min}$;

the first distance $D_{r,\,min}$ is a road distance along the one optimum route that has minimum cost among the first set of optimum routes; and the second distance $D_{l,\,min}$ is smallest straight line distance among the second set of straight line distances.

5. A navigation apparatus comprising:

a route calculation device according to claim 1;

a guide device configured to perform a route guidance operation to guide along the recommended route set by the route calculation device.

6. A non-transitory computer readable medium comprising a program to cause a computer of a route calculate device to function as a controller recited in claim 4.

7. A navigation apparatus comprising:

a route calculation device according to claim 4;

a guide device configured to perform a route guidance operation to guide along the recommended route set by the route calculation device.

* * * * *